United States Patent [19]
Kodama

[11] Patent Number: 5,287,466
[45] Date of Patent: Feb. 15, 1994

[54] METHOD AND APPARATUS FOR PARALLEL LOADS EQUALIZING UTILIZING INSTRUCTION SORTING BY COLUMNS BASED ON PREDICTED INSTRUCTION EXECUTION TIME

[75] Inventor: Takashi Kodama, Kanagawa, Japan

[73] Assignee: Mitsubishi Denki Kabushiki Kaisha, Tokyo, Japan

[21] Appl. No.: 674,689

[22] Filed: Mar. 25, 1991

[30] Foreign Application Priority Data

Jul. 17, 1990 [JP] Japan ............................. 2-188997

[51] Int. Cl.$^5$ ............................................ G06F 15/16
[52] U.S. Cl. .................................. 395/375; 395/800; 364/DIG. 1; 364/262.4; 364/262.9; 364/228.7
[58] Field of Search .............................. 395/375, 800

[56] References Cited

U.S. PATENT DOCUMENTS

| | | | |
|---|---|---|---|
| 4,497,023 | 1/1985 | Moorer | 395/375 |
| 4,626,989 | 12/1986 | Torii | 395/375 |
| 4,807,115 | 2/1989 | Torng | 395/375 |
| 4,847,755 | 7/1989 | Morrison et al. | 395/800 |
| 4,858,176 | 8/1989 | Wilhite et al. | 395/375 |
| 4,903,196 | 2/1990 | Pomerene et al. | 395/375 |
| 4,905,183 | 2/1990 | Kawaguchi | 395/800 |
| 4,916,652 | 1/1990 | Schwarz et al. | 364/748 |
| 4,942,525 | 7/1990 | Shintani et al. | 395/375 |
| 5,051,885 | 9/1991 | Yates, Jr. et al. | 395/375 |
| 5,091,848 | 2/1992 | Kojima | 395/800 |
| 5,129,067 | 7/1992 | Johnson | 395/375 |

OTHER PUBLICATIONS

Wilf, Herbert S., "Algorithms and Complexity," Prentice-Hall, 1986.

*Primary Examiner*—Robert B. Harrell
*Assistant Examiner*—Richard Lee Ellis
*Attorney, Agent, or Firm*—Wolf, Greenfield & Sacks

[57] ABSTRACT

A parallel processing system wherein the instruction field of each instruction is additionally provided with execution predict count information representative of the number of basic clocks required to execute the instruction, and sort circuits that rearrange a group of instructions on the basis of the execution predict count information are provided and wherein the group of instructions are divided into a plurality of blocks in units of columns, as a prefetching processing, and the blocks of instructions prefetched in units of columns are alternately subjected to sorting in descending order and sorting in ascending order by the sort circuits on the basis of the execution predict count information.

14 Claims, 5 Drawing Sheets

METHOD AND APPARATUS FOR PARALLEL LOADS EQUALIZING UTILIZING INSTRUCTION SORTING BY COLUMNS BASED ON PREDICTED INSTRUCTION EXECUTION TIME

BACKGROUND OF THE INVENTION

The present invention relates to a parallel processing system for use in a parallel computer that executes instructions in parallel with a plurality of processing elements.

FIG. 5 shows a basic concept of a parallel computer in which a group of instructions are processed in n processing elements. In the figure, reference numeral 1 denotes a group of instructions, and 2 processing elements. FIG. 6 is a conceptual view showing a basic processing operation that is executed in a typical conventional parallel computer, in which reference numeral 1a denotes an instruction group in which the instructions 1 are arranged in order in units of rows, 3 an instruction queue, and 2 processing elements. The instructions of the instruction group 1a are sent to the instruction queue 3 and then sent to the processing elements 2 where they are processed.

The operation of the conventional parallel processing system will next be explained. If the group 1 of instructions (see FIG. 5) which are to be inputted to and processed in the processing elements 2 are in the form, for example, of a matrix that comprises n rows and n columns, as illustrated, these instructions are arranged in units of rows to form a group 1a of instructions (see FIG. 6), and processing elements 2 in which the rows of instructions are to be processed are determined arbitrarily. Each row of instructions in the group 1a is temporarily stored in the instruction queue 3 until a processing element 2 becomes vacant. When the processing of the previous instruction is completed in each processing element 2, tile subsequent instruction is sent to the processing element 2 from the instruction queue 3 to execute processing of this instruction.

The conventional parallel processing system suffers, however, from the problems stated below. For example, when a group of instructions which are in the form of a matrix comprising n rows and n columns are executed, since the prior art gives no consideration to the sequence in which the instructions are arranged, the rows of instructions (i.e., processors) in many cases greatly differ from each other in terms of the length of processing time required, so that the processing elements cannot be used efficiently.

SUMMARY OF THE INVENTION

In view of the above-described problems of the prior art, it is an object of the present invention to provide a parallel processing system wherein a group of instructions are rearranged so as to equalize the periods of time required to execute various instructions, and the time required for the rearrangement is adjusted to a mean value of the periods of instruction execution time so that the rearrangement time will not constitute any overhead with respect to the processing, and the loads on the various processing elements are equalized, thereby enabling an efficient parallel processing operation to be carried out by a parallel computer.

The present invention provides a parallel processing system wherein the instruction field of each instruction is additionally provided with an execution predict count information representative of the number of basic clocks required to execute the instruction, and sort circuits that rearrange a group of instructions on the basis of the execution predict count information are provided and wherein the group of instructions are divided into a plurality of blocks in units of columns, as a prefetching processing, and the blocks of instructions prefetched in units of columns are alternately subjected to sorting in descending order and sorted in ascending order by the sort circuits on the basis of the execution predict count information.

DETAILED DESCRIPTION OF THE PREFERRED EMBODIMENTS

Figure 1:
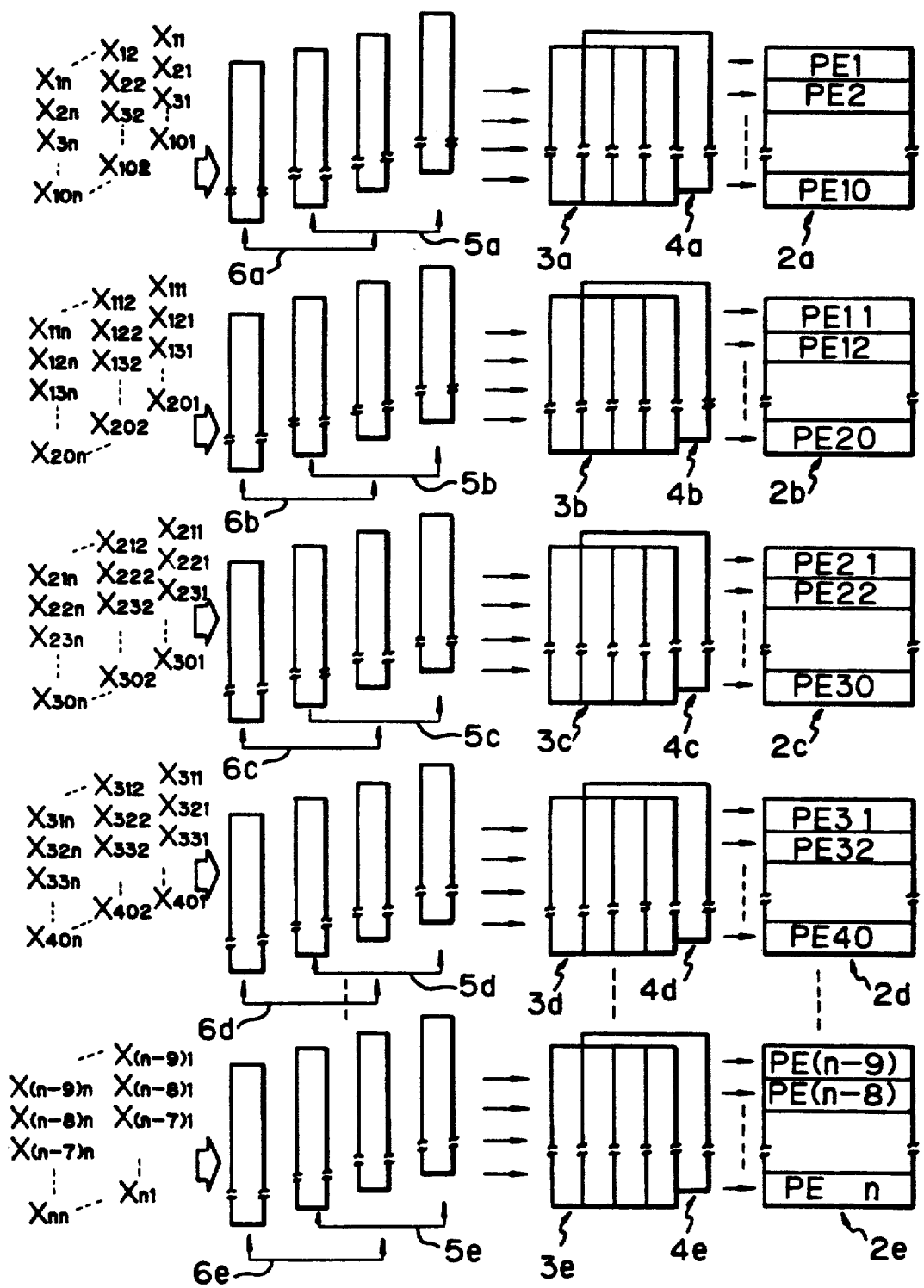
FIG. 1 is a block diagram showing a parallel processing system according to one embodiment of the present invention.

FIG. 1 is a block diagram showing a parallel processing system according to one embodiment of the present invention. In the figure, reference numerals 2a to 2e denote processing elements in an arithmetic processing unit that is provided in a parallel computer, 3a to 3e and 4a to 4e instruction queues that feed instructions to the divided processing elements 2a to 2e, and 5a to 5e and 6a to 6e sort circuits that rearrange a group of instructions on the basis of instruction execution predict count information that is added to the instruction field section of each instruction. The sort circuits 5a to 5e sort each block of instructions in descending order on the basis of the execution predict count information, the sort circuits 6a to 6e sort each block of instructions in ascending order on the basis of the execution predict count information. The above-mentioned blocks comprise trains of instructions obtained by dividing a group of instructions into blocks in units of columns as a prefetch processing.

Figure 2:
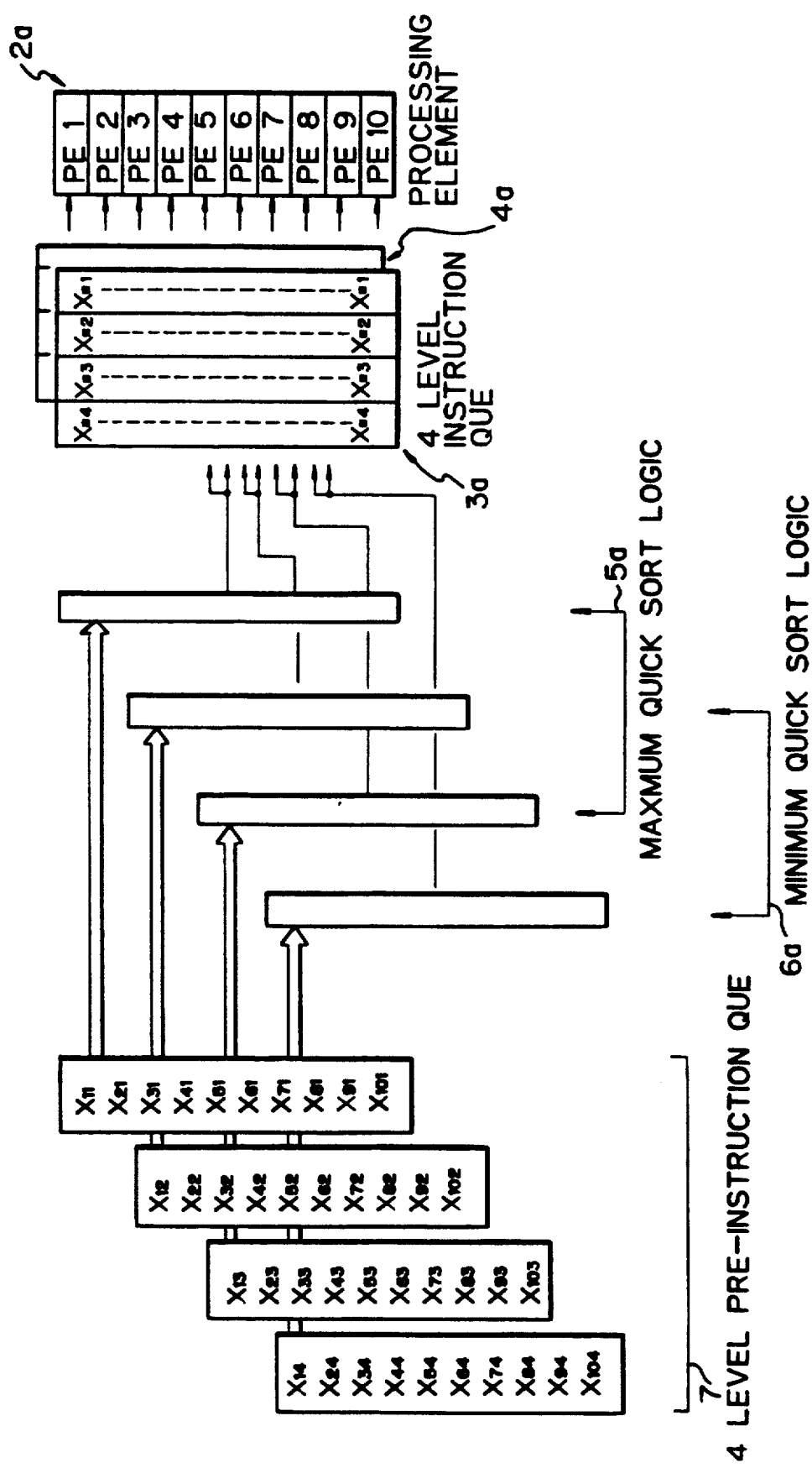
FIG. 2 is a block diagram showing a set of constituent elements extracted from the arrangement shown in FIG. 1 to explain this embodiment.

FIG. 2 is a block diagram showing a set of constituent elements extracted from the arrangement shown in FIG. 1 to explain this embodiment. Reference numeral 7 in FIG. 2 denotes a preinstruction queue for temporarily storing a group of instructions which are to be sent out to the sort circuits 5a and 6a.

Figure 3:
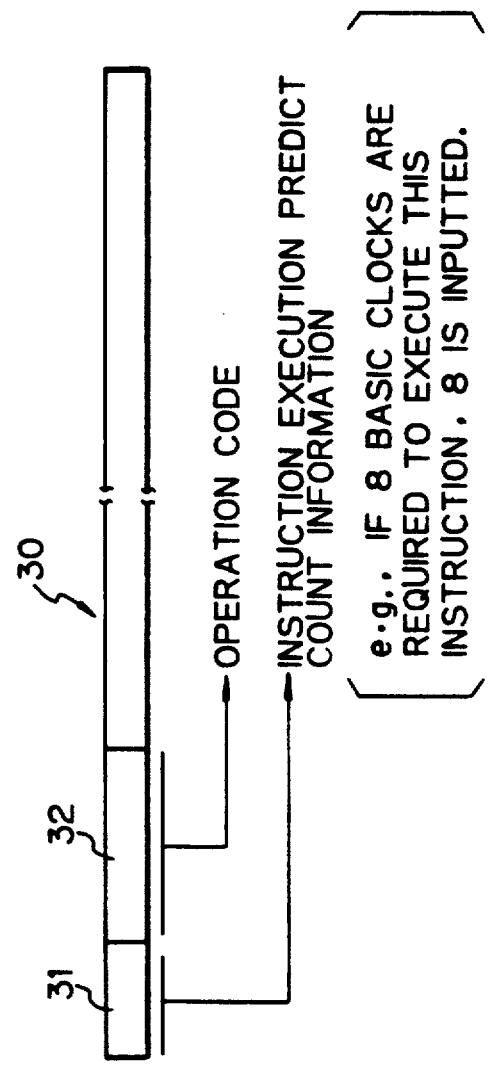
FIG. 3 shows the arrangement of an instruction field section in this embodiment.

FIG. 3 shows the arrangement of an instruction field section in this embodiment. The instruction field section 30 has an instruction execution count field 31, which is representative of instruction execution predict count information, before an operation code field 32. More specifically, the instruction execution count field 31 is provided at the top of the instruction field 30.

This embodiment is based on the following four basic ideas:

(1) Inputting a group of instructions to processing elements at random is not efficient because the load distribution is one-sided. The loads on the processing elements are fairly well equalized by combining together instruction blocks which are obtained by alternately subjecting a group of instructions to sorting in descending order and sorting in ascending order in units of columns.

(2) If the mean of the periods of time required to rearrange a group of instructions is equal to or smaller than the mean of the periods of time required for the processing elements to execute instructions, the rearrangement does not create an overhead.

(3) Assuming that the parallelability of this parallel computer is n and the number of columns of instructions which are prefetched is A, the number of instruction elements which are prefetched is An. If the parallelability n itself is divided into Bm (m is the number of instruction elements in 1 block, and B is the number of blocks), A and m are factors that determine a mean time that is required to rearrange a group of instructions.

(4) If the number of objects of sorting is n, the mean sort (execution time in the quick sort algorithm is 2 n log n.

The item (3) will be explained below more specifically.

It is assumed that the parallelability n is 100. In the following description, T denotes basic clock time.

(i) If two columns are simultaneously subjected to sorting (including descending and ascending sorting operations), the mean sort execution time per column is given by $$2n \log n/2 = 200T$$

(ii) If four columns are simultaneously subjected to sorting, the mean sort execution time per column is given by $$2n \log n/4 = 100T$$

(iii) If n = 4 m, that is, columns are divided into 4 blocks, and two columns are simultaneously subjected to sorting, the mean sort execution time per column is given by $$2m \log m/2 = 34.95T$$

(iv) If n = 10 m, that is, columns are divided into 10 blocks, and 4 columns are simultaneously subjected to sorting, the mean sort execution time per column is given by $$2m \log m/4 = 5T$$

As will be clear from the above, A and m in the item (3) are factors that determine the time required to rearrange a group of instructions.

The operation of this embodiment will be explained below with reference to FIGS. 1 and 2, in which A and m in the item (3) are set at 4 and 10, respectively, i.e., A=4 and m=10. That is, if n=100, the condition of (iv) holds. As has been exemplified in (i) to (iv),, the instruction rearrangement execution time can be controlled using A and m in the item (3) as parameters. If the value of this execution time is adjusted to the mean instruction execution time of the processing elements 2a to 2e, the parallel computer can be operated efficiently.

The operation will first be explained with reference to FIG. 2. It is assumed that n=100 and the arrangement is adapted for the condition of (iv) (i.e., A=4 and m=10).

The top 10 instructions in the first 4 columns of a group of instructions which consists of 100 rows and 100 columns are temporarily stored in the preinstruction queue 7 and then delivered to the sort circuits 5a and 6a. In this embodiment, two different kinds of sort circuits, that is, two descending order sort circuits 5a and two ascending order sort circuits 6a, are provided for a total of 4 columns to realize simultaneous sorting of 4 columns of instructions. Thus, the mean sort execution time per column is 5 T. The results of the sorting are stored in the instruction queues 3a an(i 4a. Each instruction queue can store instructions for 4 columns. In this embodiment, two instruction queues 311 and 4a are provided. These instruction queues 3a and 4a function as input buffers for the processing elements 2a. Accordingly, while instructions are being sent from one instruction queue to the processing elements 2a, the other instruction queue is used to store the sorting results from the sort circuits 5a and 6a, thereby enabling instructions to be sent continuously to the processing elements 2a. The processing elements 2a execute processing according to the instructions sent from the instruction queues 3a and 4a.

FIG. 1 shows the arrangement of a parallel computer comprising a plurality of sets of instruction queues, sort circuits and processing elements, such as those described in connection with FIG. 2.

More specifically, if n=100, 10 blocks, each including 10 processing elements (i.e., the arrangement shown in FIG. 2), are assembled together to form a parallel computer.

Figure 4:
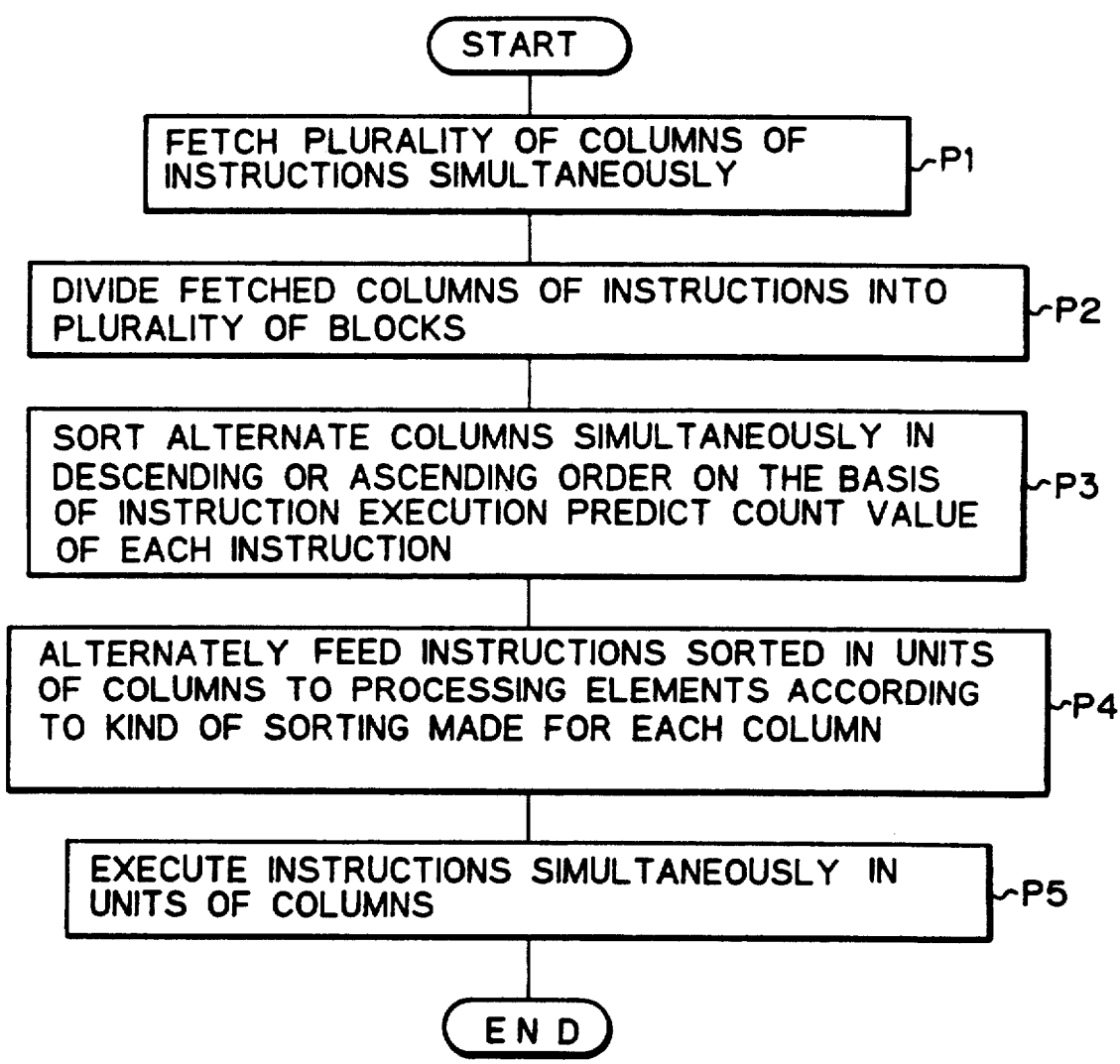
FIG. 4 is a flowchart showing the parallel processing method according to the present invention.
Figure 5:
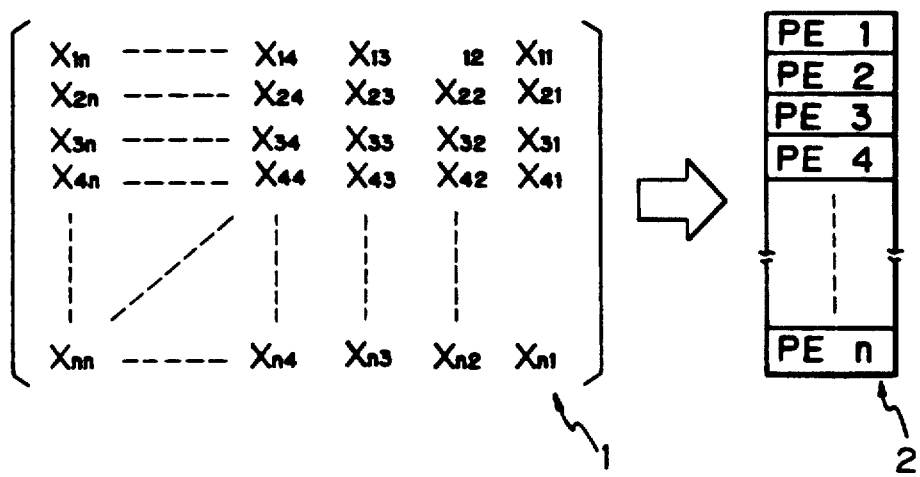
FIG. 5 shows a basic concept of a parallel computer in which a group of instructions are processed in n processing elements.
Figure 6:
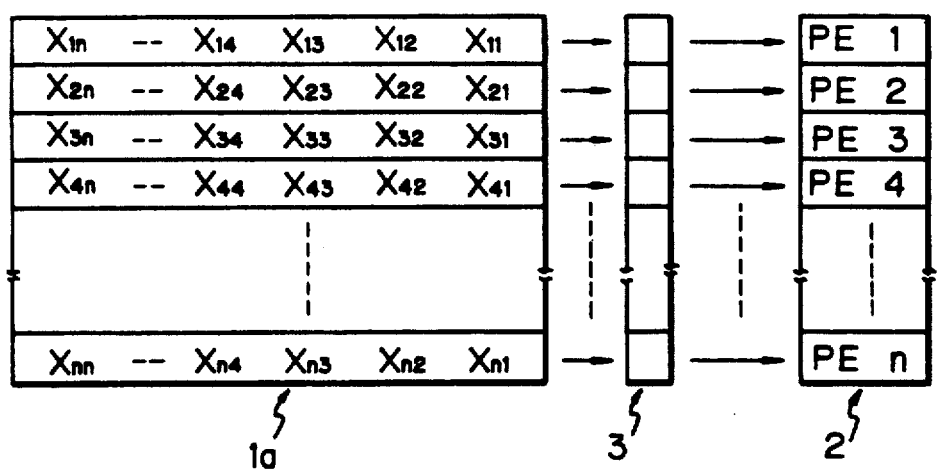
FIG. 6 is a conceptual view showing a basic processing that is executed in a typical conventional parallel computer.

The following is a description of a method of performing parallel computation by feeding instructions to processing elements in a parallel computer having n processing elements for simultaneously processing a group of instructions in the form of a matrix of m rows and n columns, in units of columns. The parallel processing method will be explained with reference to the flowchart of FIG. 4.

The parallel computer according to the present invention executes pipeline processing, as described above, and it should be noted that FIG. 4 sequentially expresses various phases of the pipeline processing. In other words, FIG. 4 expresses the pipeline processing with attention being paid to each individual instruction that is processed in the apparatus of the present invention, and these illustrated phases are simultaneously executed by a pipeline system.

According to the instruction feed method of the present invention, a plurality of columns of instructions are fetched simultaneously in the phase P1. Next, the columns of instructions fetched in the phase P1 are divided into a plurality of blocks in the phase P2. Next, alternate columns are simultaneously sorted in either descending order or ascending order in the phase P3 on the basis of the instruction execution predict count information (i.e., the number of basic clocks required to execute each particular instruction, which is added to the instruction field, in this embodiment) which is representative of the load on a processing element in execution of each instruction. Next, the sorted instructions in units of columns are alternately fed to the processing elements according to the kind of sorting made for each column in the phase P4. Then, the plurality of processing elements simultaneously execute the fed instructions in units of columns in the phase P5. The steps of the phases P1 to P5 are simultaneously executed by the pipeline system, as stated above.

As has been described above, the parallel computer in this embodiment has the sort circuits 5a to 5e and 6a to 6e, the instruction queues 3a to 3e and 4a to 4e, the processing elements 2a to 2e, etc. to execute processing of the respective instruction blocks, thereby processing instructions by the pipeline system. It is possible according to this embodiment to avoid concentration of load on a specific processing element and effectively distribute the load to the processing elements. It is also possible to realize a prefetch processing which is matched with the mean instruction execution time of the processing elements (i.e., a mechanism that feeds instructions to the processing elements continuously can be realized).

According to the foregoing embodiment, the mean sort execution time can be determined using as parameters the number of columns of instructions prefetched and the number of instruction elements in 1 block, and the mean sort execution time and the mean instruction execution time can be quantitatively matched with each other. Accordingly, it is possible to provide a parallel computer in which the load on each processing element can be equalized and optimized in conformity with the processing performance of the processing element.

Although in the described embodiment each processor unit comprises 10 processing elements and instructions for 4 columns are prefetched, it should be noted that each processor unit may comprise any desired number of processing elements and the number of columns prefetched is not necessarily limited to 4 but may be selected as desired. Although in the foregoing embodiment the object of processing executed by each processing element is an instruction, the object may be a task that is executed according to an instruction; in such a case also, the same advantages are obtained.

Although in the foregoing embodiment the group of instructions that is fetched is regarded as a square matrix of $(n \times n)$, it should be noted that the instruction group is not necessarily limitative thereto and that a matrix of $(m \times n)$ may also be employed. If m is set at a relatively large value, it is possible to advantageously ignore the setup time for prefetching.

Thus, according to the present invention, a group of instructions are divided into a plurality of blocks in units of columns as a prefetching processing, and the blocks of prefetched columns are alternately subjected to sorting in descending order and sorting in ascending order. It is therefore possible to rearrange a group of instructions so that the instruction execution time is equalized. In addition, if the time required for the rearrangement is adjusted to a mean value of the periods of instruction execution time, the rearrangement time does not constitute any overhead with respect to the processing. Accordingly, it is possible to equalize the load on each processing element and execute an efficient parallel processing operation in a parallel computer.

I claim

1. A parallel computer, comprising:
   input means for accepting an input group of instructions having rows and columns;
   a group of n processing elements, including means for simultaneously processing a group of instructions in the form of a matrix of m rows and n columns, in units of columns;
   data feed means for fetching simultaneously a plurality of columns of instructions from said input means;
   sort means of sorting, including a first sort means for sorting a first column of instructions in descending order according to instruction execution predict count information associated with a given instruction, and a second sort means for simultaneously sorting a second column of instructions in ascending order; and
   means for feeding said first column and said second column consecutively to said processing elements.

2. A parallel computer according to claim 1, wherein said data feed means includes means for outputting a block of columns of instructions simultaneously; and wherein said sort means further includes a plurality of said first sort means, each first sort means operating independently; a plurality of said second sort means, each second sort means operating independently; and means for switching successive blocks of columns of instructions alternatively to a first sort means and to a second sort means.

3. A parallel computer according to claim 2, further comprising an instruction queue circuit that is connected between said sort means and said group of n processing elements.

4. A partial computer according to claim 3, wherein said instruction execution predict count information is data, in a data field of a given instruction, indicative of a number of clock cycles associated with execution of the given instruction.

5. A parallel computer according to claim 2, wherein said instruction execution predict count information is data, in a data field of a given instruction, indicative of a number of clock cycles associated with execution of the given instruction.

6. A parallel computer according to claim 2, wherein said sort means further includes a sufficient quantity of said first sort means and said second sort means such that a sort time associated with a block of instructions does not exceed a mean execution time of a block of instructions.

7. A parallel computer according to claim 1, wherein said instruction execution predict count information is data, in a data field of a given instruction, indicative of a number of clock cycles associated with execution of the given instruction.

8. A parallel computer comprising:
   fetch means for fetching a plurality of columns of instructions simultaneously from an input group of instructions in the form of a matrix of m rows and n columns;
   sort means for sorting, including first sort means for sorting a first column of instructions in descending order, and second sort means for sorting a second column of instructions in ascending order, said first sort means and said second sort means sorting simultaneously and independently according to instruction execution predict count information associated with a given instruction;
   switch means for alternately switching a first sort means and a second sort means to receive a plurality of columns of instructions from said fetch means;
   instruction queue means for receiving said first column and said second column from said sort means, and for outputting said first column and said second column consecutively; and
   processing elements having means for receiving said first column and said second column from said instruction queue means, and having means for processing instructions simultaneously in units of columns.

9. A parallel computer according to claim 8, wherein said sort means further includes a sufficient quantity of said first sort means and said second sort means such that a sort time associated with a block of instructions does not exceed a mean execution time of a block of instruction.

10. A data feed method, for use in a parallel computer having n processing elements for simultaneously processing a group of instructions in the form of a matrix of m rows and n columns in units of columns, comprising the steps of:
   (a) accepting a plurality of columns of instructions;
   (b) dividing the plurality of columns of instructions into a plurality of blocks, each block including a plurality of first alternate columns and a plurality of second alternate columns;
   (c) sorting said first plurality of alternate columns simultaneously in descending order according to instruction execution predict count information associated with a given instruction to produce a first output;
   (d) sorting said second plurality of alternate columns simultaneously in ascending order according to instruction execution predict count information associated with a given instruction to produce a second output;
   (e) feeding said first output and said second output alternately as a third output in units of columns to said processing elements; and
   (f) executing steps (a) to (e) simultaneously.

11. A data feed method according to claim 10, wherein said instruction execution predict count information is data, in a data field of a given instruction, indicative of a number of clock cycles associated with execution of the given instruction.

12. A parallel computing method, for use in a parallel computer having n processing elements for simultaneously processing a group of instructions in the form of a matrix of m rows and n columns in units of columns, comprising the steps of:
   (a) accepting a plurality of columns of instructions;
   (b) dividing the plurality of columns of instructions into a plurality of blocks, each block including a plurality of first alternate columns and a plurality of second alternate columns;
   (c) sorting said first plurality of alternate columns simultaneously in descending order according to instruction execution predict count information associated with a given instruction to produce a first output;
   (d) sorting said second plurality of alternate columns simultaneously in ascending order according to instruction execution predict count information associated with a given instruction to produce a second output;
   (e) feeding said first output and said second output alternately as a third output in units of columns to said processing elements;
   (f) executing simultaneously a plurality of instructions from said third output in units of columns; and
   (g) executing steps (a) to (f) simultaneously.

13. A parallel computing method according to claim 12, wherein said instruction predict count information is data, in a data field of a given instruction, indicative of a number of clock cycles associated with execution of the given instruction.

14. A parallel computing method, for use in a parallel computer having n processing elements for simultaneously processing a group of instructions in the form of a matrix of m rows and n columns, each instruction containing an execution predict count information data field, in units of columns, comprising the steps of:
   (a) inserting in the data field of a given instruction a value representing the number of clock cycles required to execute the given instruction;
   (b) accepting a plurality of columns of instructions;
   (c) dividing the plurality of columns of instructions into a plurality of blocks, each block including a plurality of first alternate columns and a plurality of second alternate columns;
   (d) sorting said first plurality of alternate columns simultaneously in descending order according to instruction execution predict count information associated with a given instruction to produce a first output;
   (e) sorting said second plurality of alternate columns simultaneously in ascended order according to instruction execution predict count information associated with a given instruction to produce a second input;
   (f) feeding said first output and said second output alternately as a third output in units of columns to said processing elements; and
   (g) executing simultaneously a plurality of instructions from said third output in units of columns.

* * * * *